Dec. 7, 1926.　　　　　　　　　　　　　　　　　　　1,609,824
J. G. JONES ET AL
PHOTOGRAPHIC FILM CARTRIDGE SEALING MACHINE
Filed May 19, 1923　　　　　6 Sheets-Sheet 5

INVENTORS,
John G. Jones & Haywood G. Dewey,
BY
ATTORNEYS.

Dec. 7, 1926.　　　　　　　　　　　　　　　　　　　　　　1,609,824
J. G. JONES ET AL

PHOTOGRAPHIC FILM CARTRIDGE SEALING MACHINE

Filed May 19, 1923　　　　6 Sheets-Sheet 6

CHART SHOWING MOVEMENTS OF PARTS.

| DEGS. I | Needle Arm II | Chopper III | Holding Finger & Rocking Cam IV | Holding Finger Trip V | Transfer Drum VI | Geneva & Rotor VII | Paster Wet end Rolls VIII |
|---|---|---|---|---|---|---|---|
| 0 | Starts Down. | | | | At Left | Stationary | Stationary |
| 6 | | Starts Down. | | | | | |
| 12 | Stops on Paster | | | | | | |
| 33 | | | Stops Down Starts Up. | | | | |
| 36 | | | | | | | |
| 60 | Starts Up | | | | | | |
| 63 | | | Stops Up. | | | Starts to Right | |
| 69 | | | | | | | |
| 72 | Stops Up | | | | | | |
| 105 | Starts Down. | | | | | | |
| 114 | | | | | Stops at Right Over Cartridge. | | |
| 153 | Stops on Cartridge | | Starts to Rotate Shaft | | Starts toward Cartridge. | | |
| 207 | Starts Up | | Stops Rotating Shaft. | Stops on Cartridge | | | |
| 240 | | | Starts to Rotate Shaft in other Direction. | | | Starts to rotate | Starts to feed out paster. |
| 261 | Stops Up. | | | | Starts to Left | | |
| 318 | | | Stops Rotating Shaft. | | | | |
| 360 | | | | Leaves Cartridge | Stops at Left Over Paster. | Stops | Stops. |

FIG_14.

INVENTORS,
John G. Jones & Haywood G. Dewey,
BY
ATTORNEYS.

Patented Dec. 7, 1926.

1,609,824

UNITED STATES PATENT OFFICE.

JOHN G. JONES AND HAYWOOD G. DEWEY, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC-FILM-CARTRIDGE-SEALING MACHINE.

Application filed May 19, 1923. Serial No. 640,262.

This invention relates to paster-applying machines and particularly to machines for automatically applying the outside paster bands to spools or cartridges of photographic film. It has for its object to provide a machine which will receive the completely wound film cartridge, hold the convolutions against unwinding, feed out a paster band, cut off the paster, carry it over to the film cartridge and press it firmly into contact on the cartridge, finally dropping the cartridge in a box or other receptacle. Another object is to accomplish these steps without attention from an operator. Another object is to make a uniformly completed product, and other objects will appear hereinafter, the novel features being pointed out in the claims at the end of the specification.

This machine is particularly adapted for use as one of the units of an automatic film spooling lathe, such as is shown in our application, Serial No. 642,398, filed May 31, 1923, by John G. Jones and Haywood G. Dewey, or in connection with a semi-automatic film spooling machine such as is shown in pending application, Serial No. 516,229 of John G. Jones, filed November 18, 1921.

In the drawings, wherein like reference characters denote like parts throughout.

This machine is especially designed to pick up a spool upon which convolutions of film, paper and sometimes carbon paper are wound into what is commercially known as a photographic film cartridge, and apply to it an "outside paster band" which is a strip of adhesive coated paper used to hold the end of the backing paper from unwinding.

Figure 2:
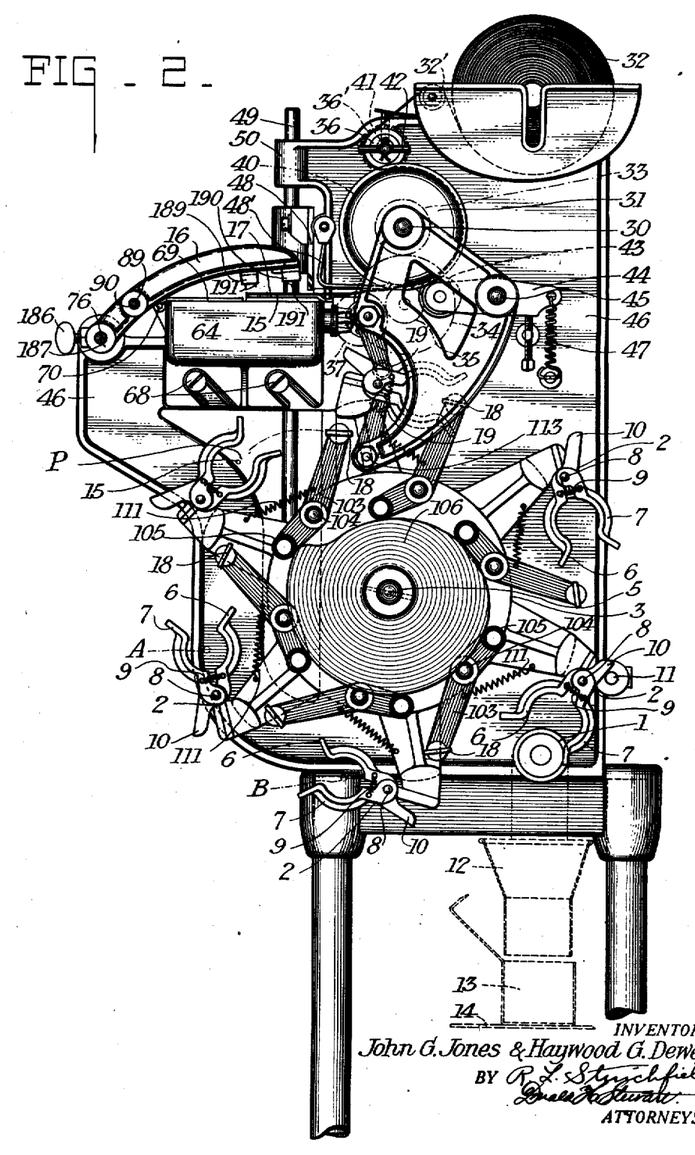
Fig. 2 is a side elevation of the same machine but taken from the opposite side.
Figures 4, 5:
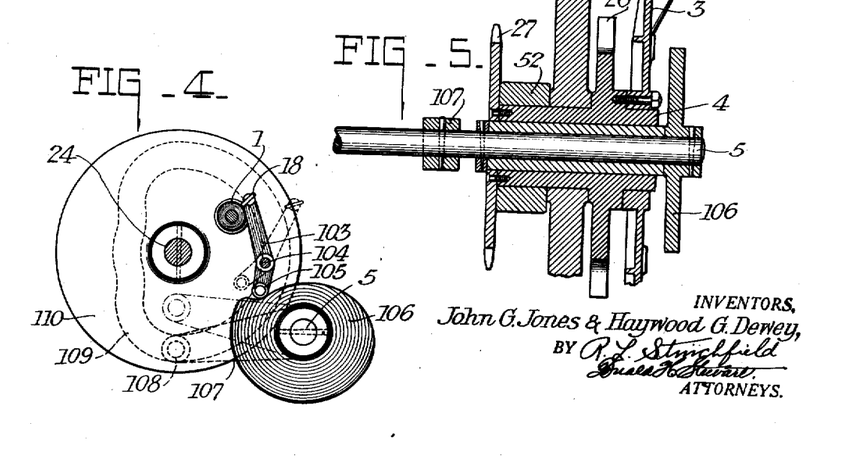
Fig. 4 is a detail illustrating the holding finger trip.
Fig. 5 is a section through certain parts including the Geneva and rotor.

As indicated by letters A and B, (Fig. 2) film cartridge 1 may be received from a supply mechanism at some point between these stations by one of the pairs of jaws 2. As all of these are the same, only one will be described. The jaws are all mounted on a rotor 3 carried by the sleeve shaft 4 mounted to turn freely about shaft 5 (Fig. 5). The pair of jaws 2 consists of a fixed jaw 6 and a movable jaw 7, hinged at 8 to the first jaw, and having a spring 9 tending to hold them together as shown in Fig. 2. As shown in Fig. 5 the jaws are mounted in pairs indicated at 7 and 7' to grasp the ends of the cartridge 1. These jaws automatically engage a cartridge placed in their path. A tail 10 is provided on jaw 7 to strike a trip bar 11, thus dropping the spool 1 into a guideway 12 which directs it into a box 13 moved into place by an endless belt 14.

The paster band 15 is applied at station P, Fig. 2, at which place arm 16 picks up the conditioned paster from table 17 and places it on the spool, where it is held by holding finger 18 until smoothed and pressed about the spool by rollers 19, which form wrapping members which cause the paster to adhere to the cartridge.

Figure 1:
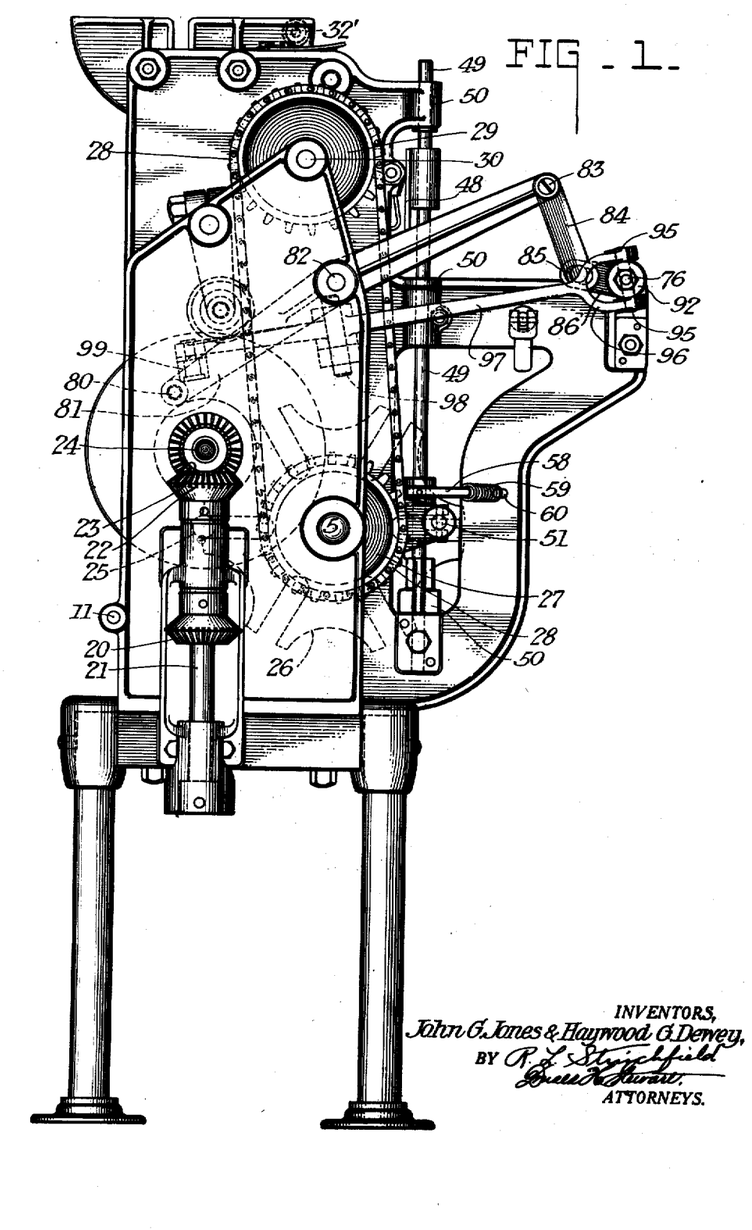
Fig. 1 is a side elevation of a machine constructed in accordance with and illustrating one form of our invention.

As best shown in Figs. 1 and 2, paster 15 is fed by the following mechanism: Suitable power is applied to constantly rotate bevel gear 20 and with it shaft 21, bevel gears 22 and 23, shaft 24 and the Geneva movement consisting of pin 25 and Geneva gear 26. Geneva gear 26 thus periodically turns sleeve shaft 4 and with it rotor 3 and sprocket 27 (Fig. 5). Sprocket 27 through chain 28 and sprocket 29 turns shaft 30 to which is affixed the paster moving drum 31. The paster 15 is drawn from a roll 32 over guide roll 32' to a roller 36 which is driven by pinion 36′ meshing with a gear 40 on shaft 30. This roller, 36 is mounted on an eccentric shaft 41 which can be moved by handle 42 for separating rollers 36 and 31 for convenience in threading. A second roller 43 carried by arm 44 pivoted at 45 to frame 46 is normally held against the roller by spring 47. The strip then passes beneath a guide 48′ to a knife 48 carried by rod 49 slidably mounted in a bearing 50.

Figures 8, 9:
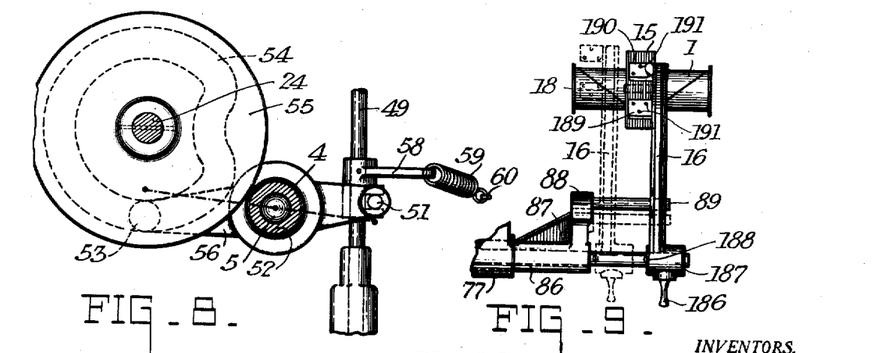
Fig. 8 is a detail of the chopper-operating mechanism.
Fig. 9 is a detail illustrating the movement of the needle arm.

The knife is periodically actuated by the mechanism shown in Fig. 8. Disk 55 has a cam slot 54 in which roller 53 travels, this roller being carried by a lever 56 freely movable about sleeve shaft 4 on bearing 52, and which periodically moves rod 49 through pin 51. An arm 58 under the influence of spring 59 attached at 60 to the frame tends to turn rod 49 to keep the knife 48 against the cutting edge 61 in the usual manner. Cam 55 is mounted upon and driven by shaft 24. The timing of this cam is illustrated graphically in the chart, Fig. 14, where, in column III the movement of this chopper is shown in its relation with the other parts to be later described.

Figure 10:
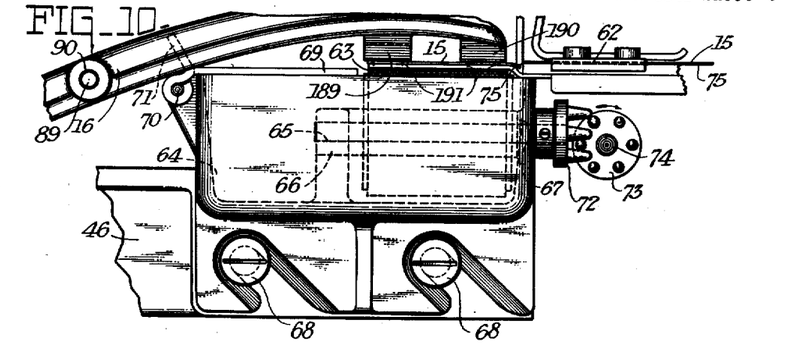
Fig. 10 is a detail of the needle arm and paster-dispensing and moistening mechanism.
Figure 11:
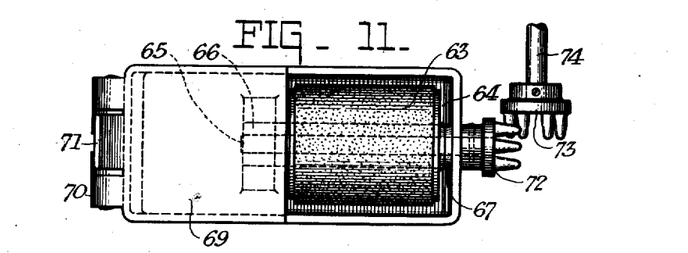
Fig. 11 is a top plan view of the paster moistener.

When paster 15 is fed beneath the knife it passes out upon a guide 62 over a roller 63, (Figs. 10 and 11) which is preferably of felt, being suspended in the tank 64 by a shaft 65 carried in bearings 66 and 67. This tank is removably held upon the frame 46 by screws 68 and has a cover 69 hinged at 70 having an operating handle 71 to cover the end of the tank for filling. Shaft 65 has a post gear 72 which meshes with a second gear 73 of the same kind, and which is mounted on shaft 74, driven through gears 37, 35, 34 and 33 from shaft 30 (Fig. 2). Obviously the moistening roller moves only when the measuring roll 31 moves so that its movement is shown with that of the paster roll in column VIII of the chart, Fig. 14. As the roller 63 turns it moistens the water adhesive surface 75 of the paster.

Figure 14:
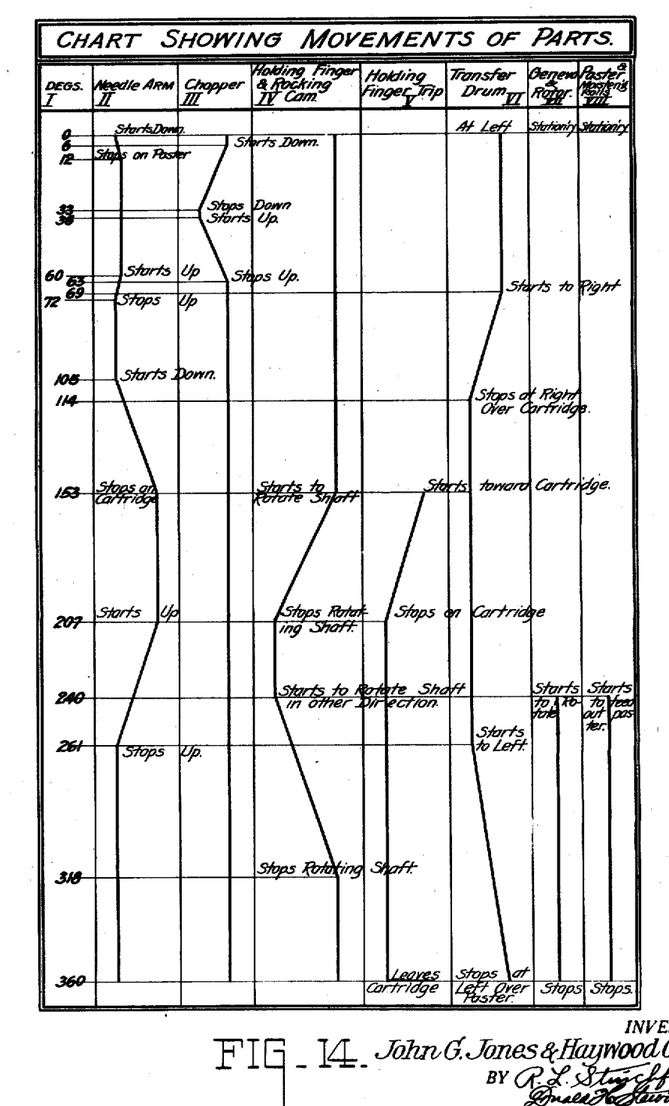
Fig. 14 is a cam chart showing the relative movements of the various cams and moving parts.

From chart, Fig. 14, it will be seen that the paster roll 31 (column VIII) feeds out the paster and after it stops feeding the needle arm 16 (column II) is lowered upon paster 15 holding it still while the chopper (column III) functions.

Figure 3:
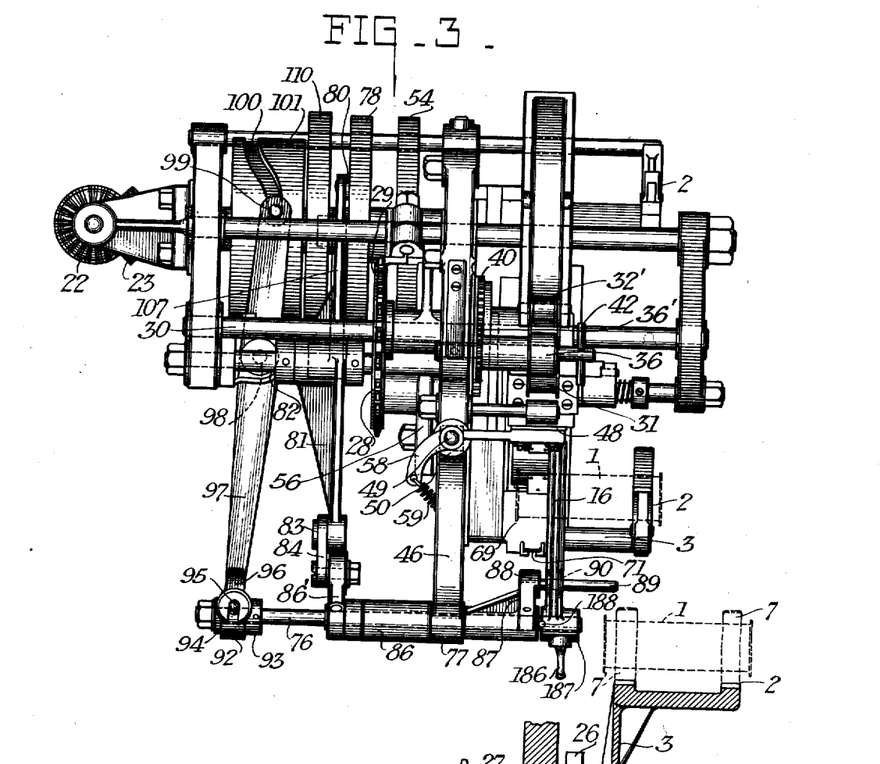
Fig. 3 is a top plan view of our machine.

The movements of this needle arm 16 will now be described. Referring to Fig. 3, needle arm 16 is mounted upon a shaft 76 free to turn and slide in a bearing on the inside of sleeve shaft 86, which is carried by bearing 77 of the main frame 46.

Figure 6:
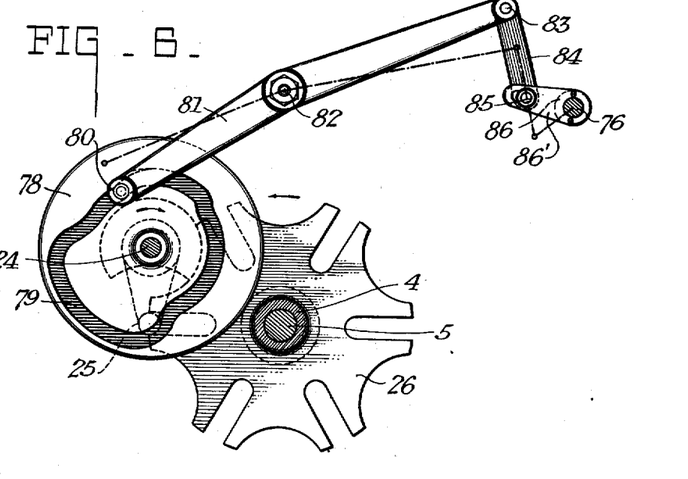
Fig. 6 is a detail of the needle arm rocking cam operating mechanism.
Figure 7:
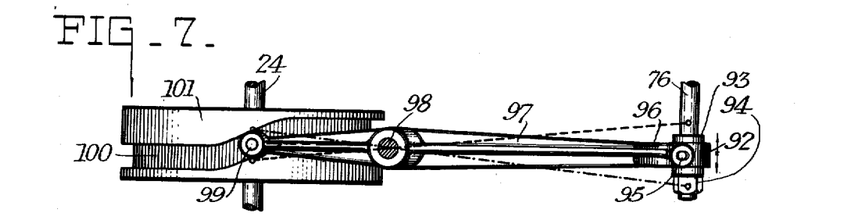
Fig. 7 is a detail of the needle arm slide operating mechanism.

The up-and-down movement of arm 16 is secured by the mechanism best shown in Figs. 1, 3 and 6 and consists of a cam disk 78 having a cam slot 79 in which a roller 80 travels, the roller being carried by a lever arm 81 fulcrumed at 82 to the frame and being pivoted at 83 to link 84, which is pivoted at 85 to a rocker arm 86′ affixed to a sleeve shaft 86 surrounding and turning upon shaft 76. The sleeve shaft 86 turns in bearing 77 and carries at one end 87 a bracket 88 to which a pin 89 is affixed. This pin extends through an aperture 90 in arm 16, being slidable therethrough. Sleeve shaft 86 does not slide through bearing 77, but merely turns in it. It does, however, permit shaft 76 to slide through the sleeve as well as turn in it. It is obvious that as cam disk 78 is rotated by shaft 24, shaft 76 will be raised and lowered. In column II of the chart, Fig. 14, the movement of the needle arm 16 is clearly shown.

The back-and-forth movement of shaft 76, necessary to cause the needle arm 16 to pick up paster 15 and carry it across from table 17 to the cartridge held by a pair of jaws 6—7, is actuated as follows: Shaft 76 is movable longitudinally in bearing 86 (which is a sleeve shaft carried by bearing 77 of the frame) so as to move arm 16 back and forth upon pin 89 between the positions shown in dashed and full lines, Fig. 9. Needle arm 16 is fastened to shaft 76 by thumb screw 186 which holds the base 187 against pin 188. At the opposite end of arm 16 are two spaced heads 189 and 190, each carrying needle points 191, which engage and hold paster 15. Shaft 76 carries a head 92 free to turn between washer 93 and washer 94, the head 92 having pins 95 extending to each side. These pins are engaged by a yoke 96 of lever 97 pivoted to the frame at 98 and carrying a roller 99 engaging cam slot 100 of cam disk 101 mounted to turn with shaft 24. As shown in Fig. 14, this, the transfer drum, gives a movement diagrammatically shown in column VI.

After having moved paster 15 by needle arm 16 into contact with a cartridge (Fig. 9) it is necessary to hold the paster against the cartridge while the needle arm 16 leaves. This is done by a holding finger 18. As there are, in this form, six of these and all alike, one will be described in detail. Finger 18 is on the end of a bell-crank lever 103 pivoted at 104 to the rotor 3 and having a roller 105 contacting with cam 106 keyed to shaft 5. This shaft does not rotate, but is merely rocked by means of arm 107 having a roller 108 following the cam slot 109 of disk 110 pinned to shaft 24. Thus, as may be seen from Fig. 4, cam 106 is periodically oscillated in such timed relation with rotor 3 that a finger 18 passes the loading station and then is turned back between the spaced heads 189 and 190 of needle arm 16, (dashed lines Fig. 9) thus holding the paster as needle arm 16 is retracted. Still holding the paster against the cartridge (the rotor moves until rollers 19—19 contact with paster 15, Fig. 12) at which time cam 106 is oscillated causing the holding finger to drop away from the cartridge, (see dashed lines, Fig.

4). Springs 111 hold rollers 105 against cam 106. For the movement of cam 106 see chart in Fig. 14, column IV.

Figure 12:
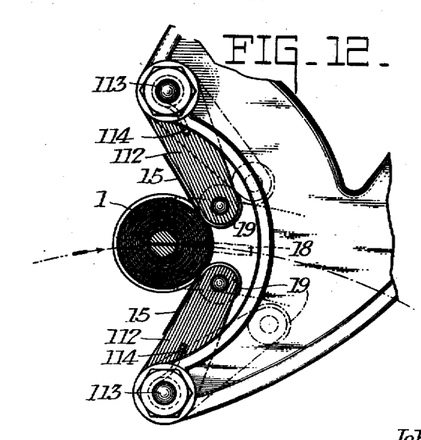
Fig. 12 is a detail of the paster-pressing rollers.
Figure 13:
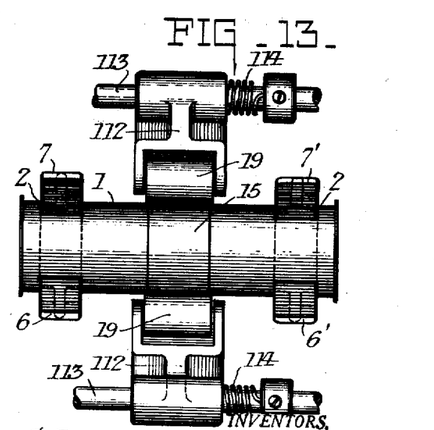
Fig. 13 is a detail side elevation of the same parts.

As rotor 3 continues to move rollers 19—19 are pressed against the paster 15 smoothing and causing it to adhere to the cartridge, Fig. 12. Each roller 19 is carried by an arm 112, mounted on a shaft 113 and turned by spring 114 into the path of the advancing cartridge held in twin jaws 6, 7 as shown in Fig. 13.

Rotor 3 is advanced step by step by means of the Geneva gear 26 above described, the relation of its movement relative to that of the other movable parts being diagrammatically illustrated in column VII of the chart in Fig. 14. The cycle indicated in column I is, for convenience in reference, divided into 360°. This cycle indicates the performance during one-sixth of the complete operation of the machine and shows the operation from the time a cartridge comes to rest at position P to the time it comes to rest at the next position. It is to be understood that as each set of jaws comes to position A or B, whichever is the cartridge supply position, it automatically picks up a cartridge and that a series of cartridges are therefore continuously carried through the different stations, one being dropped automatically as the jaws holding it are released by projection 11.

A brief summary of this cycle of operation, which has already been fully described, will now be given. As soon as a cartridge stops at position P, the arm 16 descends, the points 19 impale the sticker band which is thereupon cut off by the chopper 19, which descends and rises. The arm 16 lifts the sticker and is then moved bodily sidewise and places the sticker against the cartridge. moistening roll 63 is turned and the cartridge and reaches it as arm 16 leaves it, holding the band 15 in position and releasing it from the points 19. As the arm 16 is then restored to original position, another length of sticker band is fed by roller 31, the paster, but the feeding means for the cartridge is advanced between rolls 19 to the next station. Just as it reaches it the finger 18 is removed, and the cycle is then repeated with the next cartridge.

The cartridges are fed to the jaws in such position that the end of the protective paper will be covered by the central part of the plaster, but the feeding means for the cartridges is no part of the present invention and is not described, and the cartridges may be fed by hand, care being taken that the end of the paper is in the proper relative position.

It is only necessary with this machine to drive gear 20 by a gear rotated at the desired speed so that the machine will function in timed relation with an automatic or with a semi-automatic spooling machine, although, of course, if desired, it can be used for applying pasters and boxing film cartridges spooled by hand, as the operator could place the wound-up cartridges manually in the clamps 6—7 as they come to stations A or B.

It is obvious that numerous embodiments of our invention are possible and we contemplate as included therein, all such modifications and equivalents as fall within the terms of the appended claims.

Having thus described our invention, what we claim as new and desire to secure by Letters Patent is:

1. In a cartridge-sealing machine, the combination with a carrier adapted to be intermittently moved through a path, of arms extending from the carrier, cartridge engaging jaws thereon adapted to hold the ends of film cartridges, a movable arm for applying a paster band to the cartridge, a holding finger mounted on the carrier and adapted to press the paster upon the cartridge, and means for moving the holding finger when the carrier is at rest.

2. In a cartridge-sealing machine, the combination with a carrier adapted to be intermittently moved through a path, of arms extending from the carrier, cartridge engaging jaws thereon adapted to hold the ends of film cartridges, a movable arm for applying a paster band to the cartridge, a holding finger adapted to press the paster upon the cartridge, and means for moving the finger to press the paster upon the cartridge while the latter remains stationary, and a second means for moving the finger to hold the paster on the cartridge as the cartridge is moved.

3. In a cartridge-sealing machine, the combination with a carrier adapted to be intermittently moved through a path, of arms extending from the carrier, cartridge engaging jaws thereon adapted to hold the ends of film cartridges, a movable arm for applying a paster band to the cartridge, a holding finger adapted to press the paster upon the cartridge while the cartridge is still and to hold the paster on the cartridge as the latter is moved, and means for moving the holding finger.

4. In a cartridge-sealing machine, the combination with a movable carrier, of a series of cartridge holders mounted thereon, means for moving the carrier from a source of power to cause each cartridge holder to move to a series of stations including a paster-applying station, a paster dispenser, a movable arm adapted to pick up a paster from the dispenser and carry it to the paster-applying station, and means for causing the paster to adhere to a cartridge held by a holder in the paster-applying station including a holding finger mounted upon the carrier, the finger being adapted to hold the paster against the cartridge while the latter is at rest.

5. In a cartridge-sealing machine the combination with a movable carrier, of a series of cartridge holders mounted thereon, means for moving the carrier intermittently from a source of power to move to a series of stations including a paster applying station, a paster dispenser, a movable arm adapted to pick up a paster from the dispenser and carry it to the paster applying station, and a holding finger movable in two directions by two sources of power, means for transmitting power from one source to move the holding finger against the cartridge while the latter is at rest, and means from the other source of power for moving the finger with the cartridge.

6. In a cartridge-sealing machine, the combination with a movable carrier, of a series of cartridge holders mounted thereon, means for giving the carrier a step-by-step movement through a path to a series of stations in the path including a paster applying station, a paster dispensing station, a movable arm adapted to pick up a paster from the dispensing station and carry it to the paster applying station, said arm being timed to place the paster on the cartridge while the latter is at rest, a holding finger adapted to press the paster upon the cartridge, said finger being movable in two directions, the movement in one direction pressing the paster on the cartridge, a cam movable to effect such movement of the holding finger, said finger being also mounted to move through a portion of the path with the movable cartridge carrier, whereby the paster will be retained on the cartridge as the cartridge is moved.

7. In a cartridge-sealing machine, the combination with a cartridge holder mounted to intermittently move a cartridge to a plurality of positions through a path, of means for applying a paster band to a cartridge, a holding finger adapted to cooperate with the paster applying means being movably mounted, means including an oscillatory member for moving the finger to and from the cartridge, and means including a rotatable member for moving the finger with the film cartridge, a plurality of rollers mounted in the path of the cartridge to smooth the paster thereon while held against the cartridge by the holding finger.

8. In a cartridge-sealing machine, the combination with a cartridge holder to move a cartridge through a path, of means for applying a paster band to the cartridge, a holding finger adapted to move into an operative position to hold the paster upon the cartridge, a power driven element for causing this movement, said finger being also adapted to move a limited distance with the cartridge, and a second power driven element for causing the second mentioned movement.

9. In a cartridge-sealing machine, the combination with a cartridge holder to move a cartridge through a path, of means for applying a paster band to the cartridge, a holding finger adapted to move into an operative position to hold the paster upon the cartridge, a power driven element for causing this movement, said finger being also adapted to move a limited distance with the cartridge, and a second power driven element for causing the second mentioned movement, the first mentioned power driven element being arranged to remove the finger from the cartridge after the finger has been moved the limited distance by the second power driven element.

10. In a cartridge-sealing machine, the combination with a cartridge holder mounted to move a cartridge between a plurality of positions with a step-by-step movement, of means for applying a paster to the cartridge, a holding finger, a power driven element for moving the finger to and from an operative position in which the paster is pressed on the cartridge, and a second power driven element adapted to move the holding finger with the cartridge, the holding being mounted on said second mentioned element.

11. In a cartridge-sealing machine, the combination with a cartridge holder mounted to move a cartridge between a plurality of positions with a step-by-step movement, of means for applying a paster to the cartridge, a plurality of holding fingers, a power driven element for moving the fingers to and from film cartridges, a second rotatably mounted power driven element for moving the holding fingers and the cartridges together, said holding fingers being pivotally mounted on the second mentioned power driven element.

12. In a cartridge-sealing machine the combination with a carrier adapted to be moved intermittently, of cartridge-engaging members mounted thereon, means for applying a paster to the cartridge, and means to hold and cause the paster to adhere to the cartridge including a holding finger, means for operating the holding finger, when the cartridge is at rest and means for operating the holding finger when the cartridge is moving.

13. In a cartridge-holding machine, the combination with a movable carrier, of a series of cartridge holders mounted thereon, means for moving the carrier intermittently, whereby the cartridge holders will be intermittently brought to a paster-applying position, a source of paster material, an arm, a movable shaft carrying the arm, means on the arm for picking up the paster, means for giving the shaft an up-and-down and backand-forth movement whereby the arm will move to and pick up the paster, then will carry it over to the paster-applying position, wherein the paster will be applied to a cartridge held by a holder.

14. In a cartridge-holding machine, the combination with a movable carrier, of a series of cartridge holders mounted thereon, means for moving the carrier intermittently, whereby the cartridge holders will be intermittently brought to a paster-applying position, a source of paster material, an arm, a movable shaft carrying the arm, needle points on the arm for engaging the paster, cams for rotating and moving the shaft longitudinally, whereby the shaft movements will cause the arm to move the needle points into a paster, then carry it to and apply it upon a cartridge held by the holders in the paster-applying position.

15. In a cartridge-sealing machine, the combination with a cartridge holder, of means for applying to a cartridge held in the holder a paster band having an adhesive on one side including means for feeding a length of paster band upon a moistening roll, a chopper and a movable arm, means for causing the arm to move down upon the paster band to hold it, means to cause the chopper to function while the paster band is so held, and means for causing the movable arm to apply the severed paster to the cartridge.

16. In a cartridge-sealing machine, the combination with a cartridge holder, of means for applying to a cartridge held in the holder a paster band having an adhesive coating on one side including means for intermittently feeding a length of paster band upon a relatively soft moistening roller, a movable arm, needle points carried by the movable arm, adapted to pierce the paster and hold it upon the soft roller, and a knife, mechanism adapted to cause the knife to chop off a length of paster material while the strip is held by the arm, and mechanism for causing the arm to apply the severed paster to the cartridge.

17. In a cartridge-sealing machine, the combination with a cartridge holder, of means for applying to a cartridge held in the holder a paster band having an adhesive on one side including a measuring roll, tensioning rollers to retain the material on the measuring roll, a power drive for intermittently operating the measuring roll, a moistening roll, a power drive for this roll driven from the operating mechanism for the measuring roll, a chopper, a power drive for the chopper synchronized with the power drives for the rolls, causing the chopper to function when the measuring and moistening rolls are at rest, and means for applying the severed paster to the film cartridge.

18. In a cartridge-sealing machine, the combination with a cartridge holder, of means for applying a paster to a cartridge held in the holder from a roll of paster band material having an adhesive on one side including a measuring roll, tensioning rollers to retain the material on the measuring roll, a power drive for intermittently operating the measuring roll, a moistening roll, a power drive for this roll driven from the operating mechanism for the measuring roll, a chopper, and a movable arm, both operated through power connections synchronized with the measuring and moistening roll power drive, whereby the arm is moved to hold the paper firmly upon the moistening roll and the chopper may sever a length of paster band while the measuring and moistening rolls are at rest, and means for moving the arm to apply the severed and moistened paster to the film cartridge.

19. In a cartridge-sealing machine, the combination with a cartridge holder in the form of a rotor, of power means for intermittently moving the rotor about a shaft, a cartridge holder mounted on the rotor and moved through a definite path by the rotor, a paster-applying arm movable to and from an operative position on the cartridge, a holding finger mounted to turn upon a shaft, a lever carrying the finger movable to and from an operative position resting against a cartridge held by the holder, and means carried by the shaft for causing the finger to move to its operative position after the paster-applying arm has moved to its operative position, and to move from this position after the paster-applying arm has moved away.

Signed at Rochester, New York, this 14th day of May, 1923.

JOHN G. JONES.
HAYWOOD G. DEWEY.

and-forth movement whereby the arm will move to and pick up the paster, then will carry it over to the paster-applying position, wherein the paster will be applied to a cartridge held by a holder.

14. In a cartridge-holding machine, the combination with a movable carrier, of a series of cartridge holders mounted thereon, means for moving the carrier intermittently, whereby the cartridge holders will be intermittently brought to a paster-applying position, a source of paster material, an arm, a movable shaft carrying the arm, needle points on the arm for engaging the paster, cams for rotating and moving the shaft longitudinally, whereby the shaft movements will cause the arm to move the needle points into a paster, then carry it to and apply it upon a cartridge held by the holders in the paster-applying position.

15. In a cartridge-sealing machine, the combination with a cartridge holder, of means for applying to a cartridge held in the holder a paster band having an adhesive on one side including means for feeding a length of paster band upon a moistening roll, a chopper and a movable arm, means for causing the arm to move down upon the paster band to hold it, means to cause the chopper to function while the paster band is so held, and means for causing the movable arm to apply the severed paster to the cartridge.

16. In a cartridge-sealing machine, the combination with a cartridge holder, of means for applying to a cartridge held in the holder a paster band having an adhesive coating on one side including means for intermittently feeding a length of paster band upon a relatively soft moistening roller, a movable arm, needle points carried by the movable arm, adapted to pierce the paster and hold it upon the soft roller, and a knife, mechanism adapted to cause the knife to chop off a length of paster material while the strip is held by the arm, and mechanism for causing the arm to apply the severed paster to the cartridge.

17. In a cartridge-sealing machine, the combination with a cartridge holder, of means for applying to a cartridge held in the holder a paster band having an adhesive on one side including a measuring roll, tensioning rollers to retain the material on the measuring roll, a power drive for intermittently operating the measuring roll, a moistening roll, a power drive for this roll driven from the operating mechanism for the measuring roll, a chopper, a power drive for the chopper synchronized with the power drives for the rolls, causing the chopper to function when the measuring and moistening rolls are at rest, and means for applying the severed paster to the film cartridge.

18. In a cartridge-sealing machine, the combination with a cartridge holder, of means for applying a paster to a cartridge held in the holder from a roll of paster band material having an adhesive on one side including a measuring roll, tensioning rollers to retain the material on the measuring roll, a power drive for intermittently operating the measuring roll, a moistening roll, a power drive for this roll driven from the operating mechanism for the measuring roll, a chopper, and a movable arm, both operated through power connections synchronized with the measuring and moistening roll power drive, whereby the arm is moved to hold the paper firmly upon the moistening roll and the chopper may sever a length of paster band while the measuring and moistening rolls are at rest, and means for moving the arm to apply the severed and moistened paster to the film cartridge.

19. In a cartridge-sealing machine, the combination with a cartridge holder in the form of a rotor, of power means for intermittently moving the rotor about a shaft, a cartridge holder mounted on the rotor and moved through a definite path by the rotor, a paster-applying arm movable to and from an operative position on the cartridge, a holding finger mounted to turn upon a shaft, a lever carrying the finger movable to and from an operative position resting against a cartridge held by the holder, and means carried by the shaft for causing the finger to move to its operative position after the paster-applying arm has moved to its operative position, and to move from this position after the paster-applying arm has moved away.

Signed at Rochester, New York, this 14th day of May, 1923.

JOHN G. JONES.
HAYWOOD G. DEWEY.

Certificate of Correction.

It is hereby certified that in Letters Patent No. 1,609,824, granted December 7, 1926, upon the application of John G. Jones and Haywood G. Dewey, of Rochester, New York, for an improvement in "Photographic-Film-Cartridge-Sealing Machines," errors appear in the printed specification requiring correction as follows: Page 3, line 41, strike out the words "moistening roll 63 is turned and" and insert instead the words *The finger 18 then moves toward,* and line 47, strike out the words "paster, but the feeding means for" and insert the words *moistening roll 63 is turned and;* same page, line 55, for the word "plaster" read *paster;* page 4, line 94, claim 10, after the word "holding" insert the word *finger;* and that the said Letters Patent should be read with these corrections therein that the same may conform to the record of the case in the Patent Office.

Signed and sealed this 1st day of February, A. D. 1927.

[SEAL.]

M. J. MOORE,
*Acting Commissioner of Patents.*

Certificate of Correction.

It is hereby certified that in Letters Patent No. 1,609,824, granted December 7, 1926, upon the application of John G. Jones and Haywood G. Dewey, of Rochester, New York, for an improvement in "Photographic-Film-Cartridge-Sealing Machines," errors appear in the printed specification requiring correction as follows: Page 3, line 41, strike out the words "moistening roll 63 is turned and" and insert instead the words *The finger 18 then moves toward*, and line 47, strike out the words "paster, but the feeding means for" and insert the words *moistening roll 63 is turned and;* same page, line 55, for the word "plaster" read *paster;* page 4, line 94, claim 10, after the word "holding" insert the word *finger;* and that the said Letters Patent should be read with these corrections therein that the same may conform to the record of the case in the Patent Office.

Signed and sealed this 1st day of February, A. D. 1927.

[SEAL.]

M. J. MOORE,
*Acting Commissioner of Patents.*